United States Patent [19]

Podlas

[11] Patent Number: 5,102,462
[45] Date of Patent: Apr. 7, 1992

[54] HIGH PRODUCTIVITY JOINT COMPOUNDS

[75] Inventor: Thomas J. Podlas, Hockessin, Del.

[73] Assignee: Aqualon Company, Wilmington, Del.

[21] Appl. No.: 625,999

[22] Filed: Dec. 12, 1990

[51] Int. Cl.$^5$ .................. C08L 1/08; C09J 101/02
[52] U.S. Cl. .................. 106/181; 106/169; 524/43
[58] Field of Search .................. 106/181, 169; 524/43

[56] References Cited

U.S. PATENT DOCUMENTS

| | | | |
|---|---|---|---|
| 4,594,108 | 6/1986 | Greminger, Jr. et al. | 252/315.3 |
| 4,720,303 | 1/1988 | Soldatos | 106/181 |
| 4,846,889 | 7/1989 | Meyer | 106/181 |
| 4,994,112 | 2/1991 | Majewicz et al. | 106/189 |

Primary Examiner—John Niebling
Assistant Examiner—P. C. Hailey
Attorney, Agent, or Firm—James K. Luchs

[57] ABSTRACT

Water demand in an aqueous joint compound composition is increased by incorporating a blend of water soluble polymer (WSP) and crosslinked polyacrylic acid water demand polymer (WDP) with a WSP to WDP blend ratio of 9:1 to 25:1. A preferred WSP is hydrophobically modified hydroxyethylcellulose. This blend may also be used for aqueous tile adhesives.

In the joint compound the thickener, comprising water-soluble cellulose ether(s) and water-insoluble but swellable polyacrylic acid or salt thereof, the acrylic component gives increased joint compound viscosity without the need to decrease water level or increase thickener level.

3 Claims, No Drawings

HIGH PRODUCTIVITY JOINT COMPOUNDS

FIELD OF THE INVENTION

This invention relates to compositions useful as joint sealing materials for the installation of wallboard panelling. More specifically, it refers to the thickener system that includes, in addition to standard non-ionic cellulosic thickeners, a small amount of a non-flocculating acrylic polymer that enhances the water demand of the joint compound.

BACKGROUND OF THE INVENTION

Wallboard for many years has been the standard material used to erect interior walls in the construction of buildings. Wallboard is installed in large panels that are nailed and glued to the wall studs and fitted together until the wall section is covered with joint compound, then with tape, and then the taped joints and all nails and screws are covered with joint compound. Upon hardening, the joint compound is sanded smooth so that it is imperceptible under paint or other wall covering.

Joint compounds generally contain a resinous binder, limestone, clay, mica, stabilizer, lubricant and thickener as the principle ingredients that are mixed with water to form a workable mass that is applied to the wall by troweling.

The water soluble polymer used to thicken and stabilize joint compounds is typically a cellulose ether, e.g., methylhydroxypropylcellulose, hydroxyethylcellulose and derivatives thereof. The thickener system is usually from 0.3% to 0.7% of the total weight of the finished joint compound. Water is typically 28-32% of the formulation weight, giving the combination of desirable working properties and reasonable manufacturing cost efficiency. Increasing the water content to levels above the typical range, i.e., above about 32%, will, of course, result in cost savings for the manufacturer, but, upon drying, cracking and shrinkage will likely be unacceptably worsened. On the other hand, very often, thickeners impart excellent working properties to joint compounds but may suffer in that the joint compound viscosity is somewhat lower than desired. Decreasing the water level below the typical range in order to increase product viscosity would be prohibitively expensive. Increasing the thickener level would be even more expensive. Methods to increase joint compound viscosity without increasing thickener levels or decreasing water levels are always an objective in the industry.

Improvements in joint compound compositions are known from U.S. Pat. Nos. 3,891,582, 4,558,079 and 3,835,074. Thickening combinations of cellulose ethers and polyacrylic acid are known from U.S. Pat. Nos. 4,720,303, 4,846,889 and 4,594,108.

Yet in spite of what was known concerning joint compound formulations, portland cements, flocculation agents and the use of polyacrylic acid compositions, it remained for the present invention to further advance the state of art for high productivity joint compound compositions.

SUMMARY OF THE INVENTION

It is the object of this invention to provide a joint compound thickener system that increases the water demand of the joint compound without causing a drop in viscosity or increasing the joint compound viscosity at a constant water level without increasing the total thickener level.

The invention provides an aqueous joint compound composition containing a thickener characterized in that the thickener is a blend of a water soluble polymer (WSP) and a crosslinked polyacrylic acid in an acid or salt form as a water demand polymer (WDP) where the WDP is present as 2.5 to 15% by weight of the total weight of WDP + WSP.

DETAILED DESCRIPTION OF THE INVENTION

Within a joint compound composition, an increase in the (attapulgite) clay level will generally cause a viscosity increase; however, joint compound workability will likely suffer, and, cracking and shrinkage after drying will be increased.

Addition of a clay flocculant such as a polyacrylamide will increase product viscosity. However, flocculant reactivity is very difficult to control, and, poor workability, short open time and gelation (livering) can result with even low levels of flocculants.

It has been discovered that the inclusion of either crosslinked poly(acrylic acid) or a salt thereof will increase the water demand of joint compounds thickened with standard cellulosic thickeners without causing any drawbacks, including those cited above. The level of crosslinked acrylic polymer that is effective is from 2.55 to 155 of the total weight of thickener. More specifically, 3.5% to 8.5% acrylic polymer has been found to be preferred to give the necessary increases in water demand.

It is the object of this invention to provide a joint compound thickener system that increases the water demand relative to a control, that is, enables one to increase the water content of the joint compound without causing a drop in viscosity, or, enables one to increase the joint compound viscosity at a constant water level without increasing the total thickener level. In this respect, it is a polymeric thickener/stabilizer. Prior art teaches a number of techniques to accomplish these objectives. Increasing the (attapulgite) clay level will generally cause a viscosity increase; however, joint compound workability will likely suffer, and, cracking and shrinkage after drying will be increased. Addition of a clay flocculant such as a polyacrylamide will increase product viscosity. However, flocculant reactivity is very difficult to control, and, poor workability, short open time and gelation (livering) result with even low levels of flocculants.

The polymeric thickener/stabilizer consists of a physical blend of a water soluble polymer and a crosslinked polyacrylic acid or salt thereof.

For the thickener, useful water soluble polymers are nonionic and contain hydrophilic moieties such as hydroxyl. Illustrative are cellulose ethers such as hydroxyethylcellulose, hydroxypropylcellulose, methylhydroxypropylcellulose, hydroxyethylhydroxypropylcellulose, ethylhydroxyethylcellulose and hydrophobically modified hydroxyethylcellulose. U.S. Pat. Nos. 4,338,277, 4,243,802 and 4,826,970 describe some suitable hydrophobically modified cellulose derivatives. The viscosity of the cellulose ether in water at 1% total solids as measured with a Brookfield L or R viscometer is from 300 to 10,000 cps. Preferably, the cellulose ether has a viscosity from about 500 to 7500 cps at 1% solids, and most preferably from about 750 to 5000 cps at 1% solids at 25° C.

For the thickener, blends of the illustrative water soluble polymers may be employed.

For the thickener, the crosslinked polyacrylic acid or neutralized salt thereof must be insoluble, but swellable, in water. Illustrative of the acid forms are Carbopol ® dry resins such as Carbopols 940, 941 and C674. Illustrative of the neutralized salts are Nalco Chemical Company products, such as Nalco 1180 and 1181. It is not the intent of the applicant to limit the choice of usable polyacrylic acids and salts thereof by these examples. Water insoluble but swellable polyacrylic acids and salts in general will be acceptable for use as a part of the thickener system described herein. Suitable polyacrylic acids and salts will absorb at least 50 g water per gram solid polymer.

U.S. Pat. No. 4,846,889 assigned to Dow Chemical Company discloses blends of water-soluble polymers with water-insoluble but water-dispersible polymers for use in tape joint compounds. Water insolubility is imparted by crosslinking. The water-insoluble polymer may be an unneutralized polyacrylic acid that is lightly crosslinked. The water-soluble polymer is a cellulose ether. The functions of these polymeric blends are to extend the working time of the composition in which they are employed and increase sag resistance. The function of the blend of water-soluble with water-insoluble but dispersible polymer described in the current invention is to increase the viscosity of the composition in which it is employed without altering any of the other beneficial properties obtained by using only the water-soluble polymer. The acceptable range of water-soluble to water-insoluble polymer which may be employed in carrying out the invention disclosed in U.S. Pat. No. 4,846,889 is generally from about 3 to 1 to about 1 to 3. The preferable ratio is from about 2 to 1 to about 1 to 2 and most preferred is a 1 to 1 ratio of water-soluble polymer to water-insoluble but water-dispersible polymer. If the polymer blends described in U.S. Pat. No. 4,846,889 are used in the ratios disclosed in said patent to thicken joint compounds, the resulting joint compounds are not commercially acceptable products. When Carbopol ® 934 or 940 or 941 polyacrylic acid is blended with water-soluble methylhydroxypropylcellulose of the type generally used to thicken joint compounds, e.g., Culminal ® MHPC 20000 PFR from Aqualon Company or Methocel ® 240S or Methocel ® 856S both from Dow Chemical Company, the resulting dope is very thick and grainy with dry texture after blending by industry-accepted means for 20 minutes, a time that is also commonly employed by those skilled in the art. A control joint compound thickened with 100% methylhydroxypropylcellulose is smooth, creamy and has an acceptable texture. The Carbopol-containing joint compound dope, prepared according to U.S. Pat. No. 4,846,889 cracks excessively upon drying compared to the aforementioned control joint compound. The adhesive properties of the Carbopol-containing joint compound are inferior to those provided by the control joint compound. Further blending of the Carbopol-containing dope for an additional 10 to 40 minutes, for a total blend time of from 30 to 60 minutes results in a joint which is still inferior to the performance of the control joint compound.

The invention described in this application also differs from that described in U.S. Pat. No. 4,846,889 in that neutralized polyacrylic acid may be employed to carry out the Invention described in this Application. One might prefer using the unneutralized polyacrylic acid if available mixing equipment provides low shear agitation. The acid will not thicken at as fast a rate as the neutralized salt, and too rapid thickening which would decrease the efficiency of the low shear mixing equipment will not occur. With high shear mixing equipment, either the polyacrylic acid or a neutralized salt thereof may be employed in carrying out the spirit of this invention.

In addition, the pH of the medium described in the current application need not preferably be 24 12, as specified in U.S. Pat. No. 4,846,889. On the contrary, it is preferred that the medium pH be of the order of 7 to 10, as is generally the case with joint compounds.

The thickener system employed for this invention can comprise from 85 to 97.5% water soluble polymer and from 2.5 to 15% crosslinked polyacrylic acid or salt thereof. More preferred are blends containing from 92 to 96.5% water soluble polymer and from 3.5 to 8.5% crosslinked polyacrylic acid or salt thereof.

A small amount of an inorganic buffering salt may be included in the blend in cases where rigid control of the rate of hydration of the polymeric materials is desired. Soluble phosphates are suited for this purpose. Monosodium phosphate (sodium dihydrogen phosphate) will slow the hydration rate. Disodium phosphate (disodium hydrogen phosphate) will quicken the hydration rate. Other salts, known to those skilled in the art, behave similarly.

When an inorganic salt is included as a part of the thickener system, it is present at from 0.10 to 2.0% by weight of the thickener system. Inclusion of the inorganic salt component is not necessary for the practical implementation of the invention described herein.

The thickening system described in this invention has also been found to be useful in increasing the water demand of tile adhesives.

Joint Compound. Most commercial joint compound formulations contain limestone, clay, mica, resinous binder, thickener, lubricant and preservative in varying amounts. The resinous binder is normally a coalescable vinyl material, such as (polyvinyl acetate. Upon drying or curing of the joint compound, it forms a thin matrix to hold the limestone, clay and other components When a fully formulated, ready-to-use mix is being prepared, the binder is usually added as an aqueous latex. With dry mixes that are diluted with water on-site, it is added as a spray-dried latex. Other materials that are useful as binders include, e.g., starch, polyvinyl alcohol (PVA) and casein. Optionally, other additives may be included in the joint compound formulation. Cellulose fibers in various form are used to increase the body of the composition so that application to a vertical wall without sagging or rundown may be facilitated. A typical joint compound will frequently also contain a dispersant and a defoamer. Talc is frequently included as a filler, in combination with limestone.

Mixing Procedure. Typically, joint compounds are prepared by combining all of the wet ingredients and mixing for about one minute to homogenize. A blend of all the solids is then added to the mixing bowl with continued mixing. The entire mass is blended for a total of about 20 minutes. This procedure was adopted in the laboratory to prepare joint compounds that illustrate the effectiveness of the investigation described herein. This procedure may be modified by different manufacturers. Sufficient mixing time is necessary to ensure complete hydration and uniform dispersibility of the thickener, as well as homogeneous dispersion of all the ingredients so that there is reasonable expectation that a state of equilibrium has been attained, assuring production of an acceptable, stable product.

Product Characterization. To characterize the products prepared in the examples, the following evaluations were carried out:

Viscosity—measured in Brabender units (B.U.) determined by ASTM C 474-67.

Adhesion—by ASTM test C 474-67.

Appearance/Texture—ratings are subjectively assigned as (very) smooth vs. grainy and creamy vs. pasty with very smooth and creamy being the most desirable.

Gelation (liverino)—also defined as "memory" or "springback", ratings are subjectively assigned as no gel (most desirable); very slight; moderate; and heavy gel (unacceptable).

The invention is illustrated by the following Examples. Parts and percentages are by weight. This invention has industrial applicability for the construction industry.

EXAMPLES 1 to 3

Joint Compound—using the general procedure described previously, joint compounds were prepared from the following formulation. The ingredients given in the table below are for illustrative purposes only. The invention is practical regardless of the sources of the raw materials. Other sources of raw materials (e.g., Pulpro limestone, Attagel or Min-u-gel attapulgite clay) may be used in the practice of the current Invention.

Joint Compound Formulation

| Ingredients | Weight % |
| --- | --- |
| Limestone (Georgia White No. 9, Georgia Marble Co.) | 61.5 |
| Attapulgite Clay (Gel B, The Milwhite Co.) | 2.0 |
| Latex Binder (Ucar ® 133, Union Carbide Corp.) | 3.0 |
| Mica (P80K, Unimin Corp.) | 2.5 |
| Propylene Glycol (Mobay Corp.) | 0.35 |
| Biocides (Troy Chemical Co.) | 0.05 |
| Thickener | 0.50 |
| Water | 30.1 |

EXAMPLE 1

This joint compound formulation was thickened with 100% hydrophobically-modified hydroxyethylcellulose (HMHEC) (AQA D-3082R from Aqualon Company). The hydrophobic modifier in AQA D-3082R is 3-N-butoxy-2-hydroxypropyl at a molar substitution level of 0.08. It has a hydroxyethyl molar substitution of 3.2. Brookfield viscosity at 1% solids is 2500 cps.

The joint compound prepared with this thickener had the following properties:

| Texture/Appearance: | Very smooth and creamy |
| --- | --- |
| Viscosity: | 510 B.U. |
| Adhesion: | Excellent |
| Gelation: | None |

EXAMPLE 2

The joint compound formulation of Example 1 was thickened with a blend of 96% AQA D-3082R +4% Carbopol ® C674 (unneutralized (polyacrylic acid from B. F. Goodrich Co.). It had the following properties:

| Texture/Appearance: | Very smooth and creamy |
| --- | --- |
| Viscosity: | 560 B.U. |
| Adhesion: | Excellent |
| Gelation: | None |

EXAMPLE 3

The joint compound formulation of Example 1 was thickened with a blend of 92.5% AQA D-3082R +7.5% Nalco 1181 (neutralized polyacrylate from Nalco Chemical Company). It had the following properties:

| Texture/Appearance: | Very smooth and creamy |
| --- | --- |
| Viscosity: | 560 B.U. |
| Adhesion: | Excellent |
| Gelation: | None |

EXAMPLE 4 to 7

Using the same procedure as used with Examples 1 to 3, joint compounds were prepared from the formulation given below. This formulation illustrates the validity of the current invention in formulations containing significantly lower binder and thickener levels. Examples 4 and 5 illustrate the effect of polyacrylic acid on joint compound viscosity when blends of water-soluble cellulose ethers are used to thicken joint compounds. Examples 6 and 7 illustrate this effect with methylhydroxypropylcellulose.

Joint Compound Formulation

| Ingredients | Weight % |
| --- | --- |
| Limestone (Georgia White No. 9) | 62.2 |
| Attapulgite Clay (Gel B) | 2.0 |
| Latex Binder (Ucar ® 133) | 2.0 |
| Mica (P80K) | 3.0 |
| Propylene Glycol | 0.35 |
| Biocides | 0.05 |
| Thickener | 0.4 |
| Water | 30.0 |

This joint compound formulation was thickened with a blend of 50% hydroxyethylcellulose (Natrosol ® 250 HHXR from Aqualon Company +50% methylhydroxypropylcellulose (Culminal ® MHPC 20,000 PFR +5% Carbopol ® C674. Its properties were:

| Texture/Appearance: | Smooth and creamy |
| --- | --- |
| Viscosity: | 525 B.U. |
| Adhesion: | Excellent |
| Gelation: | Very slight |

EXAMPLE 5

The joint compound formulation from Example 4 was thickened with a blend of 47.5% Natrosol ® HHXR +47.5% Culminal ® 20,000 PFR +5% Carbopol ® C674. Its properties were:

| Texture/Appearance: | Smooth and creamy |
| --- | --- |
| Viscosity: | 560 B.U. |
| Adhesion: | Excellent |

EXAMPLE 6

The joint compound formulation from Example 4 was thickened with 100% Culminal ® 20,000 PFR +5% Carbopol ® C674. Its properties were:

| | |
|---|---|
| Texture/Appearance: | Smooth and creamy |
| Viscosity: | 500 B.U. |
| Adhesion: | Excellent |
| Gelation: | Very slight |

EXAMPLE 7

The joint compound formulation from Example 4 was thickened with 96% Culminal ® 20,000 PFR +5% Carbopol ® C674. Its properties were:

| | |
|---|---|
| Texture/Appearance: | Smooth and creamy |
| Viscosity: | 550 B.U. |
| Adhesion: | Excellent |
| Gelation: | Very slight |

What is claimed is:

1. An aqueous adhesive for wall board or tile containing a thickener, characterized in that the thickener is a blend of 3-n-butoxy-2-hydroxypropyl hydrophobically modified hydroxyethylcellulose with a crosslinked polyacrylic acid at a pH of 7 to 10 wherein the ratio of 3-n-butoxy-2-hydroxypropyl hydrophobically modified hydroxyethylcellulose to polyacrylic acid in the blend is between 9:1 and 25:1.

2. The adhesive of claim 1 further comprising methylhydoxypropylcellulose in the thickener.

3. The adhesive of claim 1 where the polyacrylic acid has a water absorbency of more than 50g water per gram solid polymer.

* * * * *